UNITED STATES PATENT OFFICE.

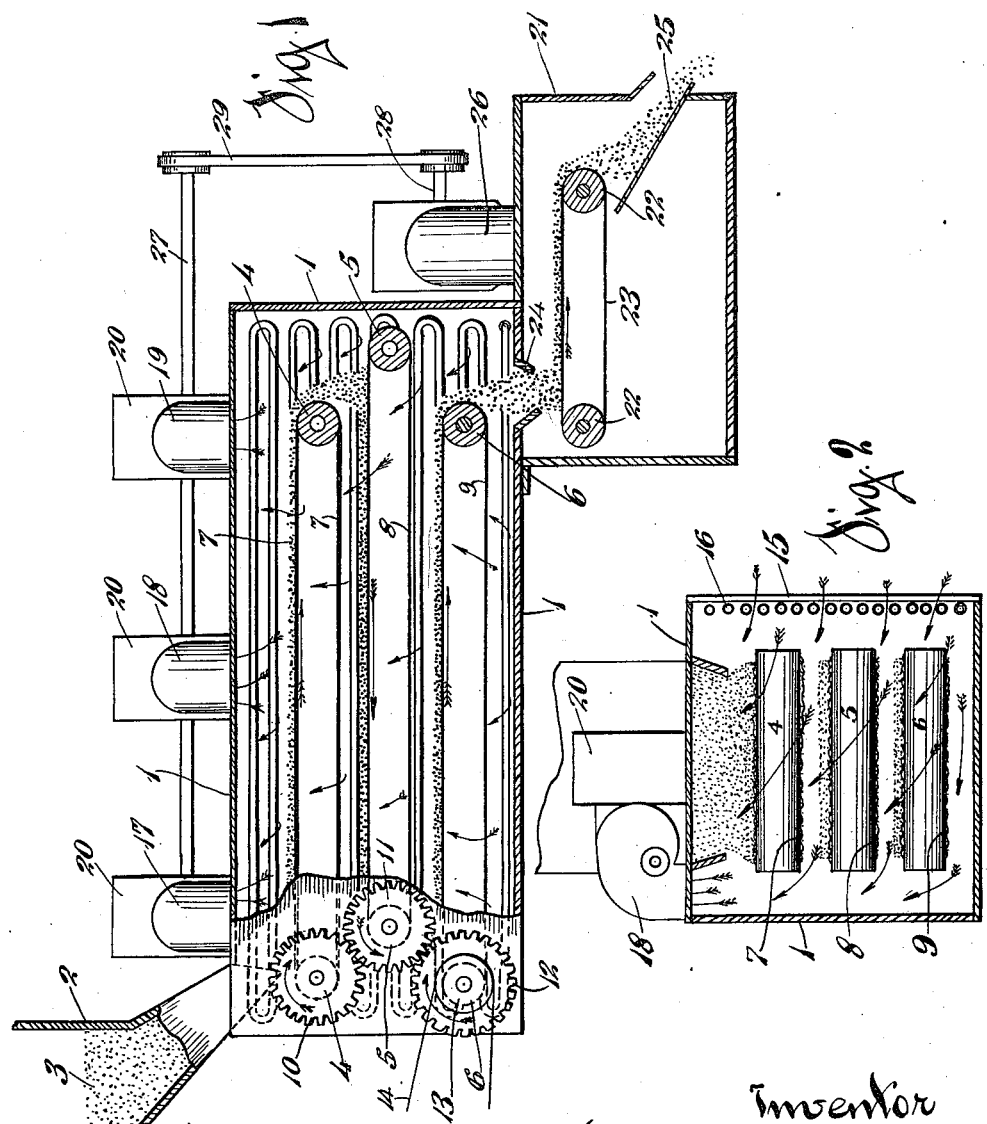

WALLACE E. McCAW, OF CINCINNATI, OHIO, ASSIGNOR TO THE PROCTER AND GAMBLE COMPANY, OF CINCINNATI, OHIO, A CORPORATION OF OHIO.

PREPARATION OF COTTON-SEED FOR MILLING.

1,293,830.   Specification of Letters Patent.   Patented Feb. 11, 1919.

Application filed July 21, 1913. Serial No. 780,359.

*To all whom it may concern:*

Be it known that I, WALLACE E. McCAW, a citizen of the United States, residing in Cincinnati, in the county of Hamilton and State of Ohio, have invented certain new and useful Improvements in the Preparation of Cotton-Seed for Milling, of which the following is a full, clear, and exact description.

In the treatment of cotton seed for the expression of oil, the seed is first passed through the seed-screening apparatus for the removal, as far as possible, of sand and dirt. The cotton seed is then delivered to the linting machines, where the lint is removed by saws. Then the seed is passed to the hulling machines, where the meats are separated from the hulls. The hulls are used in connection with cattle feed and the meats are transferred to the cookers, and after cooking, to the presses, for the expression of oil. After extraction of the oil, the press cake is ground into meal for fertilizer and other purposes. The difficulties experienced in the handling of cotton seed are due largely to the moisture present, which softens the hulls, dampens the lint and renders the material gummy and sticky. The moisture usually amounts to from 10%–25% of the cotton seed, under which the extraction of the maximum quantity of oil is rendered quite difficult.

While it has been proposed at various times to dry cotton seed and other oil-yielding material for storage or shipment, such processes do not seem to be commercially adapted for the purpose and in any event, no thought has been given to the preliminary treatment of the cotton seed preparatory to the milling operations.

My invention, therefore, consists of the improved treatment of the cotton seed in the manner and for the purposes hereinafter set forth, preparatory to milling.

The cotton seed is spread out in a suitable receptacle and is there subjected to continuous blasts of heated air, at a temperature of 160° F.–180° F. and this treatment is continued from 10 to 45 minutes. The heated seed is then immediately subjected to blasts of cool air at the normal temperature and the seed uniformly cooled to atmospheric temperature.

In the drawings I have illustrated a simple apparatus for heating and cooling the seed, although the treatment can be carried out in any other convenient way.

In the drawings,

Figure 1 is a central longitudinal section of my apparatus, and Fig. 2 is a transverse section of the same.

An inclosed casing 1, of suitable dimensions, is provided with a hopper 2 at one end, through which the cottonseed 3 to be treated is fed into the apparatus. Mounted in side walls of the casing, at each end, are a series of horizontal rollers 4, 4, 5, 5, and 6, 6, arranged one set above the other and the middle set some little distance to the right of the upper and lower sets. Over each set of rollers runs an endless belt, 7, 8 and 9 respectively, and the belts are driven by the intermeshing gears 10, 11 and 12, secured to the spindles of the rollers at one end, with the gears outside the casing, and motion is communicated by the pulley 13 and belt 14 from suitable power. One side of the casing, as 15, is open, and running back and forth in the open space lengthwise of the casing are mounted the steam pipes 16.

Located on top of the casing are a series of suction fans 17, 18 and 19, which draw air in to the open side of the casing and over the steam pipes 16 around the endless belts and out through the delivery tubes 20.

Mounted below the main casing is an additional casing 21, in which is mounted the rollers 22, 22, carrying the endless belt 23, A supply opening 24 is provided at one end of this casing over the belt or conveyer 23, and a delivery chute 25 is provided in the opposite end of the casing 21. This second casing is provided with a suction fan 26 to draw cold air through the casing 21 and over and around the endless conveyer 23.

The apparatus is made of sufficient length, and the conveyers are driven at such a rate of speed that the treatment can be continued for the proper length of time. The seed to be treated is delivered from the hopper on top of the endless belt 7 and is carried over the roller 4 and drops down upon the belt or conveyer 8, and is thence carried back and drops down upon the belt 9 and is thence carried to the end of the casing, where it passes down through the opening 24 on the conveyer belt 23 and thence out of the machine through the delivery chute 25. The air is heated by the steam coils to a temperature between 160° F. and 180° F., although I do not wish to be confined to these particular limits. The seed having been thoroughly heated by the hot air drawn by the fans over the steam pipes, is then cooled down to the normal atmospheric temperature, say, to about 70° F. in the cooling apparatus. The fans for the hot and cool air are respectively mounted on the shafts 27 and 28 and driven by the belt 29.

In this treatment, the moisture in the seed is reduced to about 7%–10%, although I do not wish to be strictly confined to these limits.

It is not sufficient to simply heat the seed, and then to allow the seed to cool down naturally. To obtain proper results, the seed must be artificially and promptly cooled to normal atmospheric temperature.

It is not essential that the cotton seed when thus treated should be immediately subjected to the milling operations, although I prefer to employ my treatment immediately preparatory to milling.

Under my treatment, the hulls are rendered brittle, the meats better adapted for the extraction of oil and throughout all the subsequent operations, great benefit and advantage is the result.

The sand and foreign matter can be much more readily removed in the sand screens and the seed prepared in much better condition for linting without additional machinery and power.

On account of the lint being drier, more fluffy and more brittle, a greater lint-yield can be obtained than could be had under the same conditions with the seed previous to treatment. This additional yield amounts to from 10 to 20% of the original yield.

Inasmuch as the hulls, under this treatment, are more brittle and the meats harder, a much more effective separation can be had, and the hullers open up and turn out the stock much coarser with fewer oil cells broken and less oil is therefore absorbed by the hulls; moreover, as the hulls are more uniformly brittle, the percentage of ammonia in the meal can be more evenly controlled, thereby obtaining a greater yield of standard grade of meal per ton of seed.

The meats can be more effectively cooked with much less steam with the entire elimination of water-balls, and there being less moisture, it is not necessary to cook at such a high steam pressure, with a great saving of time.

The oil extracted from the meats, also shows a lower refining loss and a better color, and a much improved flavor, inasmuch as the cooking can be done in a shorter time and with a relatively lower steam pressure, also on account of these conditions, a greater number of gallons of oil per ton of seed is obtained. The meal obtained from the press cake is also of much better color and commands a much better price in the market.

Then, generally, with properly prepared seed, in accordance with my process, the seed throughout is handled through the various machines with much less power and less effort than will be required when the seed is moist and gummy and requires closer hulling.

The moist and gummy seed chokes the rolls, is heavier to stir in the cookers and injuriously affects the press cloths, all of which is avoided under my treatment. The meats come to the cookers in uniform condition, require less cooking and they are in better condition for pressing.

As prepared seeds throughout are easier and more readily handled, there is a marked decrease in the labor cost per ton and in the fixed expenses. There is less wear and tear on the milling machinery, there is no tendency to choke up conveyers and the various machines, less power is required, and the wear and tear on belts and pulleys is decreased.

Having thus described my invention, what I claim as new, and desire to secure by Letters Patent, is:—

1. In the process of milling cotton seed a preliminary process which consists in heating the natural seed for a limited time to a temperature from 160° F. to 180° F. and then cooling to atmospheric temperature, and then subjecting the same to the milling operations.

2. In the process of milling cotton seed a preliminary process which consists in heating the natural seed from 10 to 45 minutes, at a temperature from 160° F. to 180° F. until the moisture is reduced to about seven per cent. to ten per cent. and then artificially cooling the heated seed to atmospheric temperature and then subjecting the same to the milling operations.

3. In the process of milling cotton seed a preliminary process which consists in subjecting the seed to blasts of air, heated to a temperature of about 160° F.–180° F. until the moisture is reduced to about seven per cent. to ten per cent. and then immediately subjecting the heated seed to similar blasts of cold air to cool the material to atmospheric temperature and then subjecting the same to the milling operations.

WALLACE E. McCAW.

Attest:
MARSTON ALLEN,
ANNA F. DIENST.